United States Patent
Lambertz et al.

(10) Patent No.: US 11,299,304 B2
(45) Date of Patent: Apr. 12, 2022

(54) DEVICE AND METHOD FOR TRANSPORTING READY-CUT AND FILLED HOSE PIECES

(71) Applicant: TEEPACK SPEZIALMASCHINEN GMBH & CO. KG, Meerbusch (DE)

(72) Inventors: Stefan Lambertz, Hürth (DE); Hans Knops, Krefeld (DE)

(73) Assignee: TEEPACK SPEZIALMASCHINEN GMBH & CO. KG, Meerbusch (DE)

(*) Notice: Subject to any disclaimer, the term of this patent is extended or adjusted under 35 U.S.C. 154(b) by 0 days.

(21) Appl. No.: 16/860,964

(22) Filed: Apr. 28, 2020

(65) Prior Publication Data

US 2020/0346798 A1 Nov. 5, 2020

(30) Foreign Application Priority Data

May 2, 2019 (EP) .................................. 19172261

(51) Int. Cl.
  *B65B 29/04* (2006.01)
  *B65B 11/02* (2006.01)
  (Continued)

(52) U.S. Cl.
  CPC .............. *B65B 11/02* (2013.01); *B65B 11/28* (2013.01); *B65B 11/48* (2013.01); *B65B 29/02* (2013.01);
  (Continued)

(58) Field of Classification Search
  CPC ......... B65B 45/00; B65B 41/12; B65B 29/04; B65B 29/02; B65B 29/028; B65B 11/48;
  (Continued)

(56) References Cited

U.S. PATENT DOCUMENTS 2,348,201 A 5/1944 Barnett
2,362,459 A 11/1944 Barnett
(Continued)

FOREIGN PATENT DOCUMENTS

CA 2331652 A1 9/1991
CN 1362924 A 8/2002
(Continued)

OTHER PUBLICATIONS

European Search Report issued in EP Patent Application No. 20171836.8 dated Sep. 10, 2020 (10 pages).
(Continued)

*Primary Examiner* — Anna K Kinsaul
*Assistant Examiner* — Himchan Song
(74) *Attorney, Agent, or Firm* — Dorsey & Whitney LLP

(57) ABSTRACT

The present invention relates to a simplified device and a process-technically simplified and also more rapidly applicable method for transporting readily cut and filled hose pieces within a machine for producing pouches filled with brewable material. The device according to the invention has a transport wheel which has several supports distributed over its circumference, each holding a pouch which are pivotally mounted on the transport wheel. In the method according to the invention, a hose piece for forming a pouch with at least one chamber between a head and a bottom is inserted in the radial direction into a support of the transport wheel. In a removal station the pouch is removed radially from the transport wheel with the bottom leading.

4 Claims, 7 Drawing Sheets

(51) Int. Cl.
*B65B 29/02* (2006.01)
*B65B 41/12* (2006.01)
*B65B 11/28* (2006.01)
*B65B 11/48* (2006.01)
*B65B 45/00* (2006.01)

(52) U.S. Cl.
CPC .............. *B65B 29/04* (2013.01); *B65B 41/12* (2013.01); *B65B 45/00* (2013.01)

(58) Field of Classification Search
CPC ........... B65B 11/28; B65B 11/02; A24C 5/35; A24C 5/38
See application file for complete search history.

(56) References Cited

U.S. PATENT DOCUMENTS

| | | | |
|---|---|---|---|
| 2,629,809 A | | 2/1953 | Frye |
| 2,823,502 A | * | 2/1958 | Adolf ................... B65B 29/028 53/133.3 |
| 6,948,292 B2 | | 9/2005 | Romagnoli |
| 8,202,079 B2 | | 6/2012 | Litzenberg et al. |
| 10,640,251 B2 | | 5/2020 | Campagnoli |
| 10,765,562 B2 | | 9/2020 | Piantoni et al. |
| 2004/0226263 A1 | * | 11/2004 | Romagnoli ........... B65B 29/028 53/134.2 |
| 2013/0105279 A1 | | 5/2013 | Ramirez |
| 2017/0233120 A1 | | 8/2017 | Spatafora et al. |
| 2017/0240306 A1 | * | 8/2017 | Spatafora ............. B65D 85/808 |
| 2019/0071199 A1 | | 3/2019 | Cassoli et al. |

FOREIGN PATENT DOCUMENTS

| | | | | |
|---|---|---|---|---|
| CN | 1483645 | A | 3/2004 | |
| CN | 1556010 | A | 12/2004 | |
| CN | 103402875 | A | 11/2013 | |
| CN | 104245533 | A | 12/2014 | |
| CN | 105329693 | A | 2/2016 | |
| CN | 107074384 | A | 8/2017 | |
| CN | 107521760 | A | 12/2017 | |
| CN | 107848644 | A | 3/2018 | |
| CN | 109641703 | A | 4/2019 | |
| DE | 3837118 | A1 | 5/1990 | |
| DE | 102007011060 | A1 | 9/2008 | |
| EP | 1268161 | A1 | 1/2003 | |
| EP | 1384664 | A1 | 1/2004 | |
| EP | 1795331 | A1 | 6/2007 | |
| EP | 1871670 | A2 | 1/2008 | |
| EP | 1731295 | B1 | 3/2008 | |
| EP | 2231479 | B1 | 8/2011 | |
| EP | 2681119 | B1 * | 12/2014 | ............. B65B 11/48 |
| EP | 3578483 | A1 | 12/2019 | |
| JP | S49-012259 | U | 2/1974 | |
| JP | S53-158761 | U | 12/1978 | |
| JP | S55-60292 | A | 5/1980 | |
| JP | S55-124979 | A | 9/1980 | |
| JP | S59-54293 | U | 4/1984 | |
| JP | S63-107542 | | 7/1988 | |
| JP | 2011079581 | A | 4/2011 | |
| JP | 2011246199 | A | 12/2011 | |
| JP | 2012511481 | A | 5/2012 | |
| JP | 2017114537 | A | 6/2017 | |
| WO | 2001/62600 | A1 | 8/2001 | |
| WO | 2010013206 | A2 | 2/2010 | |
| WO | 2012/117308 | A1 | 9/2012 | |

OTHER PUBLICATIONS

Extended European Search Report dated Jan. 13, 2020 in European Patent Application No. 19172261.0 (10 pages).
Chinese Office Action issued in CN Application No. 202010362457.2 dated Jul. 6, 2021 (7 pages).
European Search Report issued in European U.S. Appl. No. 20/193,603 dated Feb. 10, 2021 (2 pages).
Japanese Office Action issued in JP Application No. 2020-081014 dated Jul. 16, 2021 (4 pages).
Chinese Office Action issued in CN Application No. 202010372142.6 dated Jul. 15, 2021 (8 pages).
Japanese Office Action issued in JP Application No. 2020-081017 dated Oct. 8, 2021 (7 pages).
Japanese Office Action issued in JP Application No. 2021-141170 dated Nov. 4, 2021 (4 pages).

* cited by examiner

DEVICE AND METHOD FOR TRANSPORTING READY-CUT AND FILLED HOSE PIECES

FIELD

The present invention relates to a device and a method for transporting ready-cut and filled hose pieces within a machine for producing pouches filled with brewable material.

CROSS REFERENCE TO RELATED APPLICATIONS

This application claims benefit of priority pursuant to 35 U.S.C. § 119(a) of European patent application no. 19172261.0 filed May 2, 2019, which is hereby incorporated herein by reference in its entirety.

BACKGROUND

A generic device is known from EP 2 681 119 B1. This has a transport wheel which comprises several pouch receptacles distributed over its circumference.

In this previously known device, the cut and filled hose piece is radially inserted into the transport wheel to form a pouch from the hose piece. In doing so, the hose piece is formed such that a chamber of a pouch is formed which extends radially in relation to the transport wheel, wherein the bottom of the pouch lies radially inside and the head of the pouch lies radially outside. This station is also referred to as the insertion station in the description of the present invention. Thereby, the cut and filled hose piece can also be configured as a single or double chamber pouch within the scope of the invention. In any case, subsequent to the insertion station, the initially flat pre-cut is formed such that the chamber and thus the form of the pouch is essentially predetermined. The head is exposed in the area of the outer circumference of the transport wheel. In subsequent processing steps and while the transport wheel rotates, a label is fed to the head of the pouch according to the state of the art and connected to the head of the pouch. The pouch is then wrapped in a length piece of wrapping. This wrapping is basically placed around the pouch in a U-shape. The opposing edges of the wrapping are then welded together to seal the pouch completely within the wrapping. The wrapping is formed by a film through which the pouch is aroma-tightly packed within the wrapping.

When opening the thus produced packaging unit consisting of wrapping and pouch, the wrapping is usually opened in the area of and along a transverse weld seam. There, the end consumer wants to grip the pouch via the label and pull it out of the now opened wrapping. This requires that the transverse weld seam delimits the wrapping where the pouch with its label is provided.

In the state of the art mentioned above, the pouch together with the label is radially pushed out of the transport wheel and a piece of film of the wrapping is placed between the transport wheel and the pushed out pouch, which is then moved back into the transport wheel together with the wrapping, which is placed around the pouch in a U-shape. In a following station the sealing of the wrapping takes place. During this process, the wrapping is held together with the pouch in the transport wheel in a predetermined position. U-shaped sealing jaws grip the wrapping from the outside and generate in one step longitudinal welding seams and the said transverse welding seam so that the pouch is received tightly in the wrapping.

Pushing the pouch out in order to wrap it in the wrapping is complex. Considerable mechanical components are required to control this process safely and reliably. In addition, sealing the wrapping on the transport wheel leads to relatively long dwell times of the pouches on the transport wheel, since the welding seam produced during sealing must first cool down and be held by the transport wheel before the packaging unit can be radially discharged from the transport wheel.

The problem underlying the present invention is to provide a device and a method of the kind mentioned introductorily which solve all or part of the problems mentioned above.

BRIEF SUMMARY OF THE DISCLOSURE

In order to solve this problem, the present invention provides a device with the features of claim 1. In this device, the support is pivotally mounted.

This configuration offers the possibility of producing the pouch in a generally known manner with the bottom leading in the transport wheel and/or inserting it into the transport wheel. Thereby, the pouch is preferably produced as a double-chamber pouch within the scope of the invention. In this case, leading and trailing arms assigned to a support grip the cut and filled hose piece in the area of its respective free ends, while the middle area of the hose piece is lowered radially into the transport wheel. For this purpose, the transport wheel preferably has, according to the present invention—as for example known from DE 38 06 386 C1—leading and trailing arms to each support which interact with the respective end areas and clamp these, for example, against a cover and, when the leading and trailing arms are moved together, form the head of the pouch such that the initially free ends are applied against each other, if necessary also folded there, in order to close the pouch at the head end. In this respect, the transport wheel can fall back on known devices and measures to form a pouch closed at the top, in particular a double-chamber pouch, from the ready-cut and filled hose piece.

Thus, the device according to the invention can also have a profile part which is provided between the respective arms to each of the supports and which forms the bottom of the pouch in the area of the insertion station and can be lowered with it radially inwards towards the rotation axis of the transport wheel.

This profile part is usually recessed into the support and can be part of the support. The support according to the present invention is configured such that it can receive and hold the chamber of the pouch within itself. The support can hold and position the label in the subsequent stations, in which the label is fed towards the head of the pouch to be formed in a generally manner known.

The support of the device according to the invention is the component which receives the finished formed pouch, usually already closed at the top, and holds it while the thus formed pouch is moved in the circumferential direction and thus in the transport direction of the transport wheel. The arms for forming the pouch from a flat, ready-cut hose piece filled with brewable material are assigned to the support. However, these arms are not part of the support. Rather, the formed pouch is fed to the support by the arms.

The pivotable support allows the pouch to be pivoted before it is removed from the transport wheel so that the pouch is aligned with its bottom radially outwards. In this way, the pouch can be removed from the transport wheel and transferred to a sealing station, for example, which is decoupled from the rotational movement of the transport wheel in terms of its timing so that the processing steps carried out on the transport wheel to complete the pouch are not extended by holding and cooling times associated with sealing the wrapping and producing the packaging unit. The sealing station can include a separate sealing transport wheel which receives the pouch and feeds sealing jaws, for example. On its way into the sealing transport wheel, the pouch is preferably connected to the wrapping material, wherein the wrapping material can lead the pouch with its fold, which connects two opposite legs of the wrapping, wherein, during the removal movement of the pouch from the transport wheel, the pouch and the wrapping are moved relative to one another and are brought into the sealing transport wheel in their final relative alignment with one another and are positioned there and the sealing takes place in a generally known manner, in which the legs are joined, usually sealed, around the pouch at the edges and ends to produce an aroma-tight package. Thereby, it is essential that the film encloses the pouch aroma-tightly.

Usually, the hose piece is inserted into the support at the insertion station in a strictly radial direction so that the chamber extends strictly radially and the bottom is closest to the rotation axis, whereas the head is furthest away from the rotation axis. In view of this, according to a preferred further development of the present invention, a removal station is proposed in which the support is pivoted by about 180° with respect to the alignment of the insertion station and the pouch is removed radially from the transport wheel with the bottom leading. The removal station is usually associated with a pouch handling device and a wrapping material handling device, which on the one hand remove the pouch radially from the transport wheel and on the other hand grip the wrapping material in the area of its center in order to form a fold there and insert this fold into the sealing holding wheel in front of the pouch. The pouch handling device grips the pouch and inserts it into the sealing station.

According to another preferred configuration of the present invention, a label feeding station, in which a label is fed to the head, and a connecting station, in which a thread is connected to the label and/or the pouch, are provided between the insertion station and the removal station. In these two stations, the pouch is held in the support with the head radially outwards so that the label can be applied against the head and the label can then be connected to the pouch. The thread can be on the label or on the pouch. Preferably, the pouch is inserted into the transport wheel together with the thread already in the insertion station.

According to a preferred further development of the present invention, a thread securing station is provided between the insertion station and the removal station, which is immediately upstream of the removal station in the transport direction of the transport wheel. This transport direction corresponds to the direction of rotation of the transport wheel. In the thread securing station, a thread already connected to the label is secured to the label such that the thread is secured in a predetermined position relative to the actual pouch and the label during further processing of the pouch. For this purpose, the label usually has a slit into which the thread is pressed in the thread securing station. The label itself can be secured in position relative to the pouch by suitable shaping of the label or pouch. The pouch and accordingly the support which holds the pouch in place is pivoted by about 90°+/−10° in relation to its position in the insertion station or the removal station. In contrast to the alignment of the support in the insertion station or the removal station, the position of the support and thus of the device components acting on the pouch, in this case the devices for securing the thread to the label, is oriented to the necessity of pivoting the support on the way to the removal station already in the direction of the alignment in the removal station. This allows the removal station to be arranged to the last station before the removal station in the transport direction and the device to be made more compact or the process for finishing the pouch together with the thread and the label to a packaging unit to be accommodated in the wrapping to be carried out more quickly on the transport wheel. According to this respective further development, the support lies in the thread securing station in its main extension direction and thus the direction of insertion of the pouch is approximately tangential to the rotation axis of the transport wheel.

According to another preferred configuration, which allows a secure support and pivoting movement of the pouch or the support for the pouch, the transport wheel for each support has a bore in which an axle beam carrying the support is pivotally mounted. By attaching the support to the transport wheel, the support is safely carried along with the transport wheel. A bearing, for example a ball bearing, can be assigned to the bore, which reliably guides the pivoting movement of the axle beam and thus of the support relative to the transport wheel with low friction.

In the further development discussed here, at least one guide arm extending transversely to the pivot axis of the axle beam departs from the axle beam. This guide arm is firmly connected to the axle beam. The free end of the guide arm is guided in a baffle guide. The guide is guided with little play. For this purpose, the guide arm usually has a roller which is referred to as a cam roller and which forms a rotationally symmetrical and freely rotatable outer circumferential surface of the free end. This cam roller is accommodated in a guide groove. This guide groove is usually formed circumferentially closed in a stationary guide disk. The engagement of the free end of the guide arm in the slotted guide thus determines the relative angular alignment of the axle beam to the transport wheel. The slotted guide serves to imprint the pivoting movement of the support during the rotation of the transport wheel.

Accordingly, the slotted guide is configured circumferentially around the rotation axis of the transport wheel. With a 360° rotating movement of the transport wheel, the support is aligned due to the slotted guide in the insertion station such that the part of the support assigned to the bottom of the pouch lies radially inside, whereas this part lies radially outside in the removal station.

The axle beam preferably has at least two, and in particular preferably exactly two, guide arms with free ends, each of which is guided separately in a slotted guide. If more than one guide arm is provided, free ends of the latter usually project to different extents in the direction of the axle beam so that one free end is guided in a guide groove which, in relation to the pivot axis of the axle beam corresponding to the rotation axis of the transport wheel, is lower than the other guide groove assigned to the other guide arm. By increasing the number of slotted guides, the positioning and also the guidance of the support in the context of the rotary movement of the transport wheel is improved and a pivoting movement of the support by more than 90° is made possible.

For securing the pouch in the support, a pouch clamp may be provided which can be pivoted to an open position for insertion of the pouch into and removal of the pouch from the support, but otherwise rests against the pouch and secures it in the support. In the position securing the pouch, the pouch clamp may be applied against the pouch under spring preload of a clamping spring. The pouch clamp can, for example, be attached to an actuating sleeve which is mounted relative to the axle beam and on it so that it can be pivoted. The actuating sleeve may have an actuating arm which, in any case in the area of the insertion station and the removal station, interacts with opening cams which are stationary in relation to the rotary movement of the transport wheel and which pivot the actuating sleeve and thus the pouch clamp against the force of the clamping spring and accordingly release the pouch clamp for insertion or removal of the pouch from the support. In order to reduce friction, the opening cams usually interact with a cam roller mounted freely rotatable on the free end of the actuating arm. The opening cams usually guide the actuating arm until the pouch clamp closes so that the pouch clamp is guided and applied to the pouch or a surface limiting the support.

BRIEF DESCRIPTION OF THE DRAWINGS

Further details and advantages of the present invention result from the subsequent description of an embodiment in connection with the drawing. Therein.

DETAILED DESCRIPTION

Figure 1:
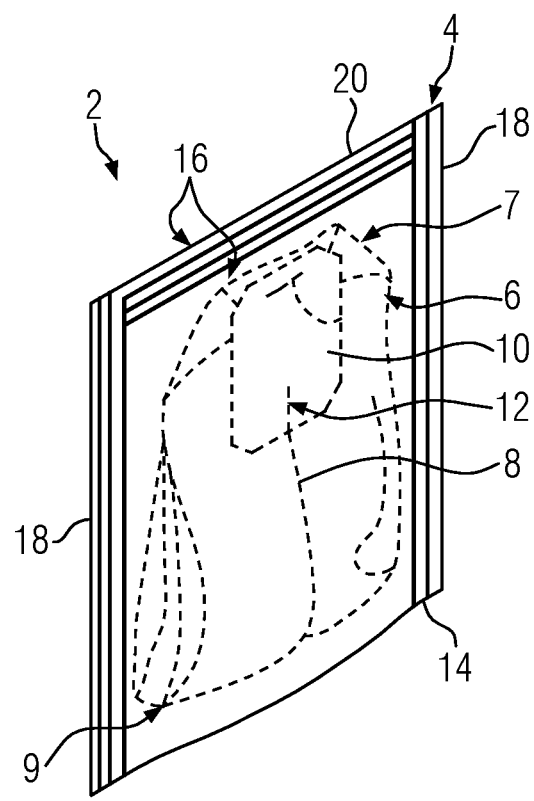
FIG. 1 shows a packaging unit which can be made with the aid of the device according to the invention, consisting of a pouch with label and thread and a wrapping.

FIG. 1 shows an embodiment of a packaging unit identified by reference sign 2, consisting of a wrapping 4 in which a pouch 6 with a thread 8 attached to a head 7 of the pouch 6 and a label 10 attached to the head 7 and thus opposite a bottom 9 of the pouch 6, which is in the form of a double-chamber pouch, are accommodated. The thread 8 is knotted to the label 10 on one side and passed through a slit 12 of the label 10 on the other side and is accordingly secured to the label 10. The contents of the wrapping are thus produced on the transport wheel described below.

The wrapping 4 consists of a length piece of aroma-tight film folded over a fold 14 to form two adjacent legs 16 and sealed by two parallel longitudinal welding seams 18 and one transverse welding seam 20.

The completion of the pouch 6 accommodated in the wrapping 4 together with the label 10 is carried out on the transport wheel described below with reference to FIG. 2 et seq., which is identified in the Figures with reference sign 100. In the views according to FIGS. 2 and 3, the transport wheel 100 rotates counter-clockwise. This direction of rotation corresponds to the transport direction T. Various stations are provided circumferentially around the transport wheel 100, in which the pouch 6 or the thread 8 or the label 10 is worked on. With reference sign 102, an insertion station is provided in which the pouch 6 is inserted into the transport wheel 100 together with the thread 8 already attached to it. For this purpose, the transport wheel 100 has a support 104 as shown in detail in FIGS. 3 to 7, which comprises a support duct 106 receiving the pouch 6, to which a pouch clamp 108 is assigned, which fixes the pouch 6 in the support 104.

Figure 2:
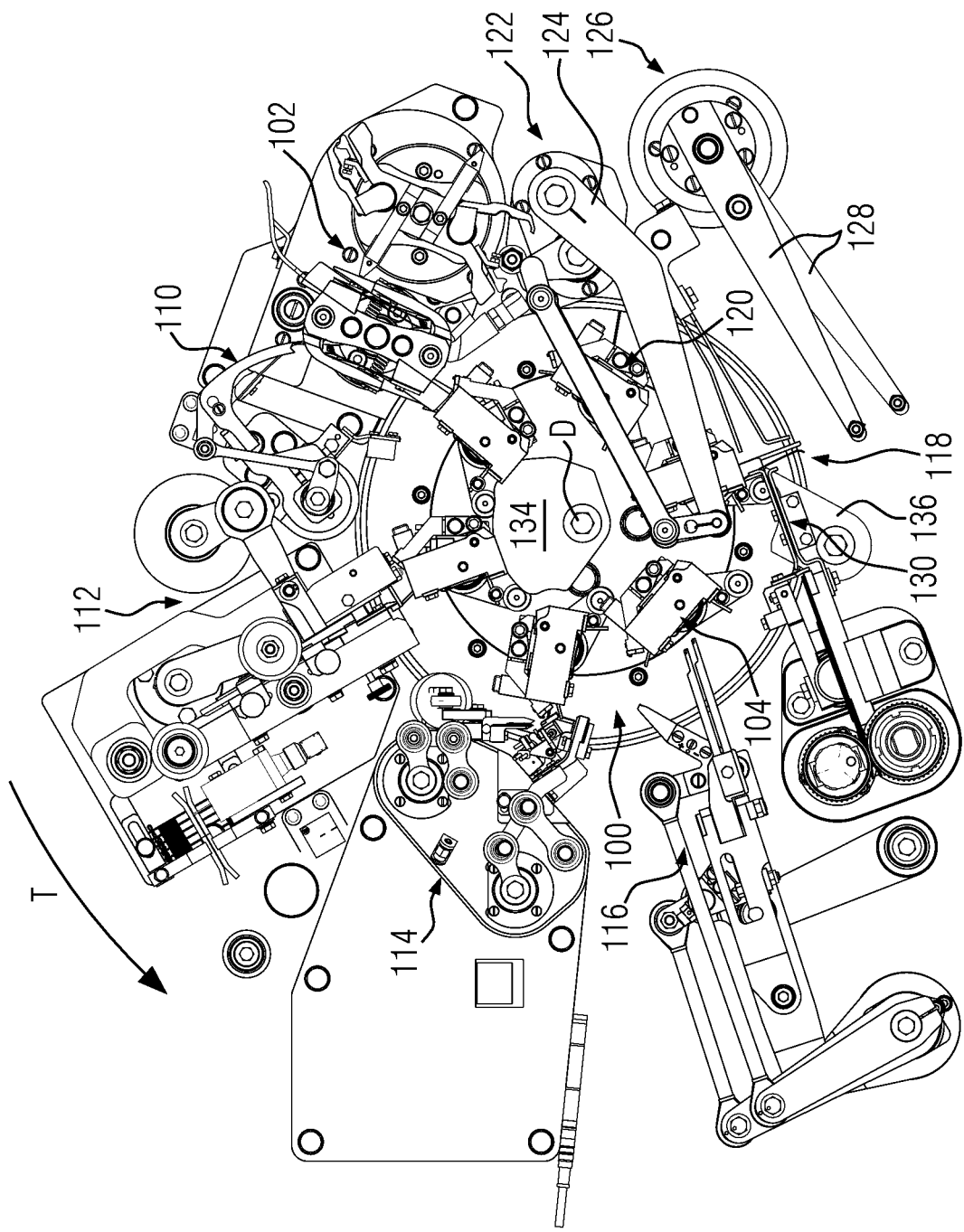
FIG. 2 shows a side view of the transport wheel according to the embodiment with different stations arranged circumferentially around the transport wheel.

As FIG. 2 illustrates, the support duct 106 in the insertion station 102 is aligned strictly radially so that the pouch 6 can be inserted into the support duct 106 by radial plugging into the support 104.

FIG. 2 shows an arc-shaped insertion segment 110 which is moved alternately to insert the pouch 6 into the respective support 104. The rotation of the transport wheel 100 is interrupted in each case. Accordingly, the transport wheel 100 is cyclically driven in rotation during the further processing of the pouch 6, wherein the transport wheel 100 stands still during the respective processing steps.

In transport direction T, adjacent to the insertion station 102, there is a label feeding station 112, into which a cut label 10, provided with a slit and holes for the passage of the thread 8, is fed to the head 7 of the pouch 6. The support 104 has a radial orientation which is unchanged compared to the orientation in the insertion station 102. The same applies to a connecting station 114 which is connected in transport direction T, in which in the embodiment the thread 8 is knotted to the label 10, as is described basically in EP 1 731 295 B1.

Following the connection station 114, the support 104 is pivoted so that this support 104 is pivoted by 90° in the thread securing station identified by reference sign 116 and accordingly extends tangentially relative to a rotation axis D of the transport wheel 100. In said thread securing station 116, the thread 8 is inserted into the slit 12 of label 10. In this way, the thread 8 is assigned to the label 10 and then to the pouch 6, in order to prevent the thread from interfering with the sealing of the edges of the wrapping material during the subsequent wrapping of the pouch or even getting caught on parts of the device during the further handling of the pouch 4 together with the label 10 and the thread 8.

A removal station is identified by reference sign 118. In said removal station 118, the pouch 6 is rotated about 180° with respect to its orientation in the insertion station 102. While the pouch 6 in the insertion station 102 is inserted with its bottom 9 leading into the support 104, the pouch 6 is pushed out with its bottom 9 leading when the pouch 6 is pushed out radially in the removal station 118.

Between the removal station 118 and the insertion station 102, a pivoting station 120 is located downstream in the transport direction of the removal station 118, in which the support 104 is pivoted about 180° so that it is adequately aligned for receiving a new pouch 6 in the insertion station 102.

Figure 3:
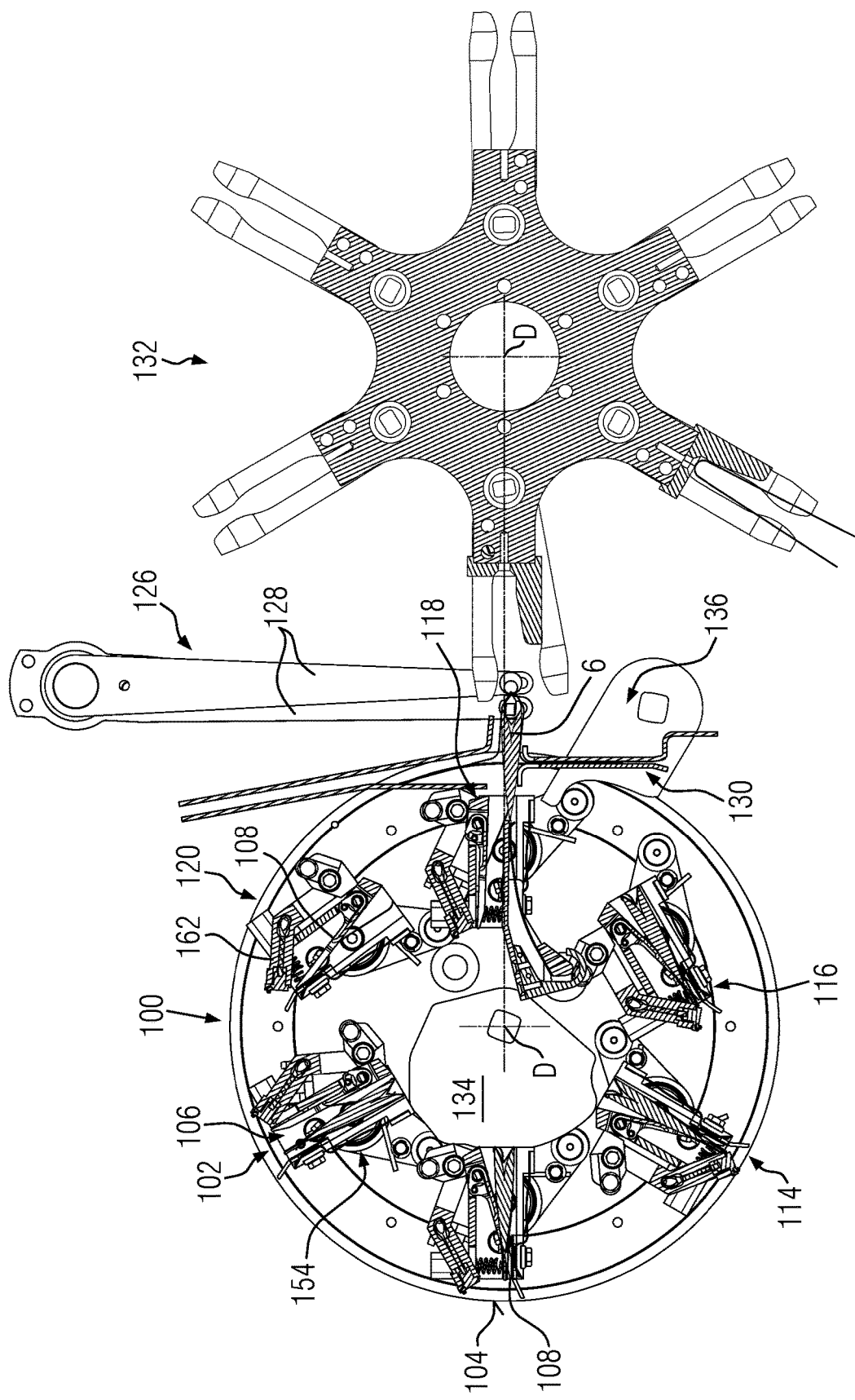
FIG. 3 shows a side view of the transport wheel according to FIG. 2 without the representation of the components of the individual stations.
Figure 4:
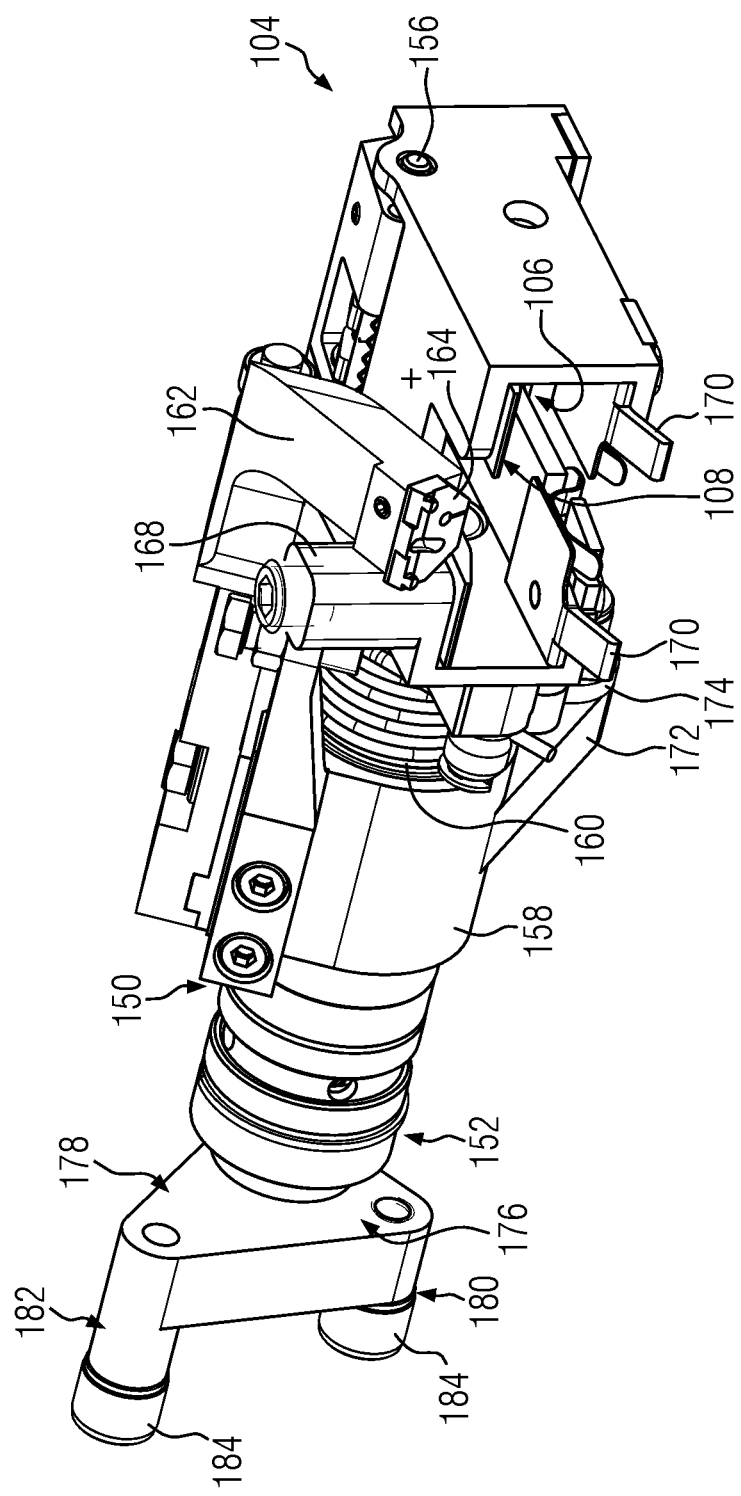
FIG. 4 shows an embodiment of a support in an open position according to FIGS. 2 and 3.
Figure 5:
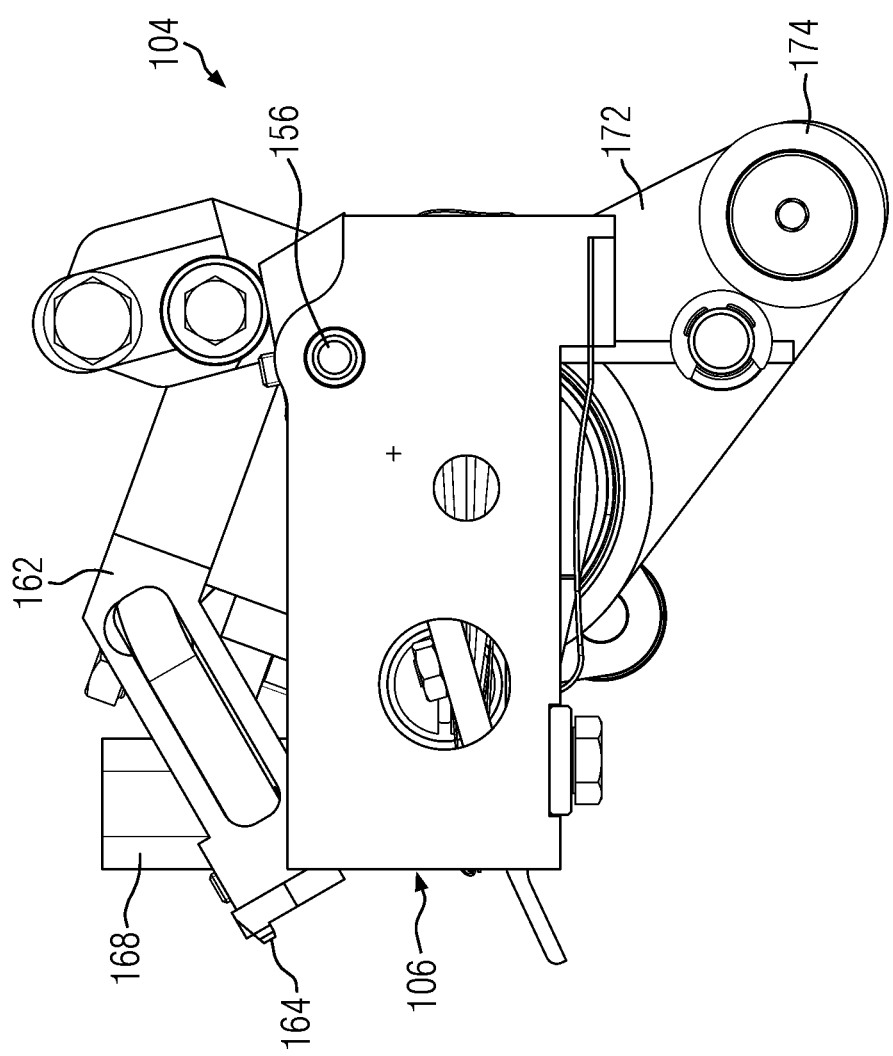
FIG. 5 shows a front view of the component according to FIG. 5.
Figure 6:
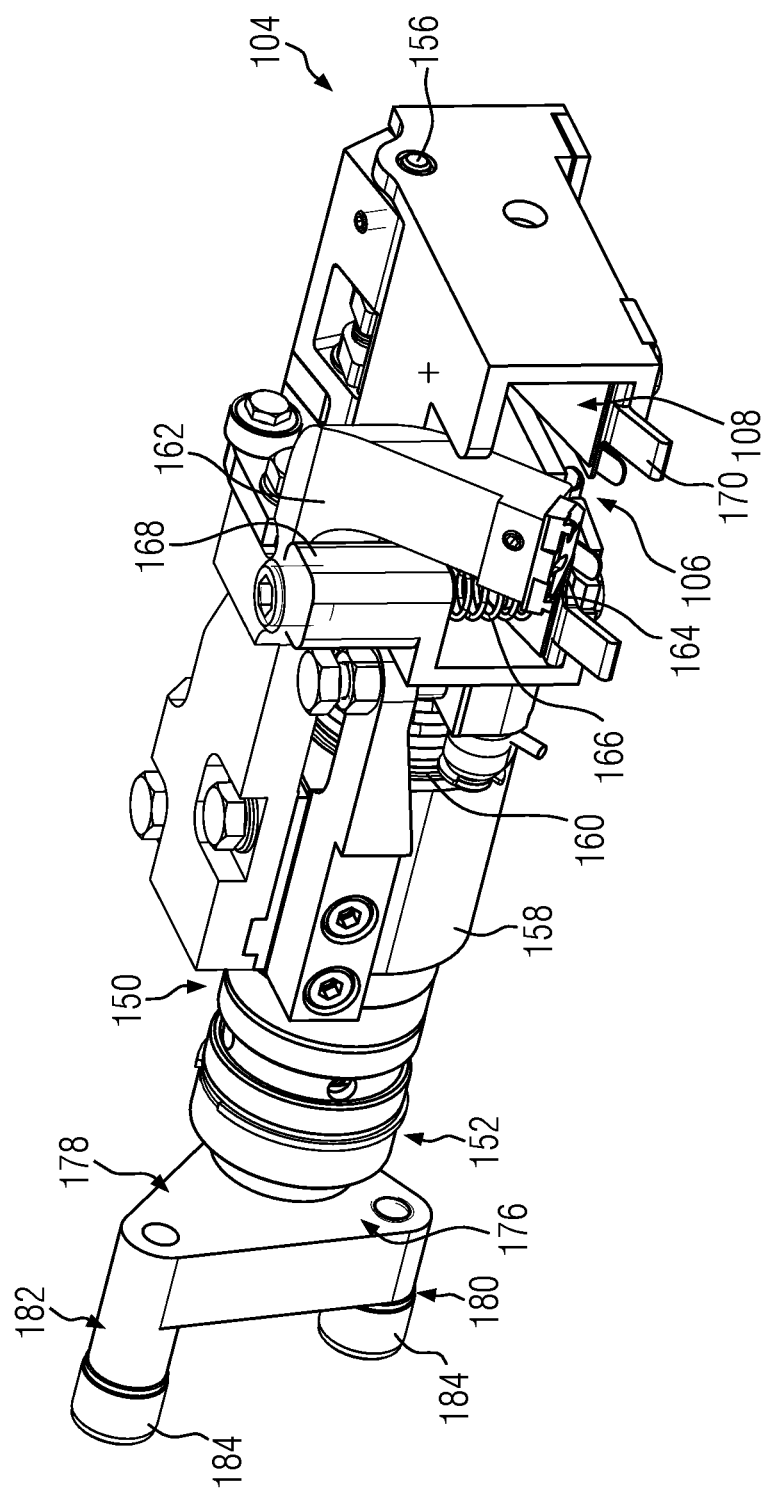
FIG. 6 shows a representation according to FIG. 4 in the closed position.
Figure 7:
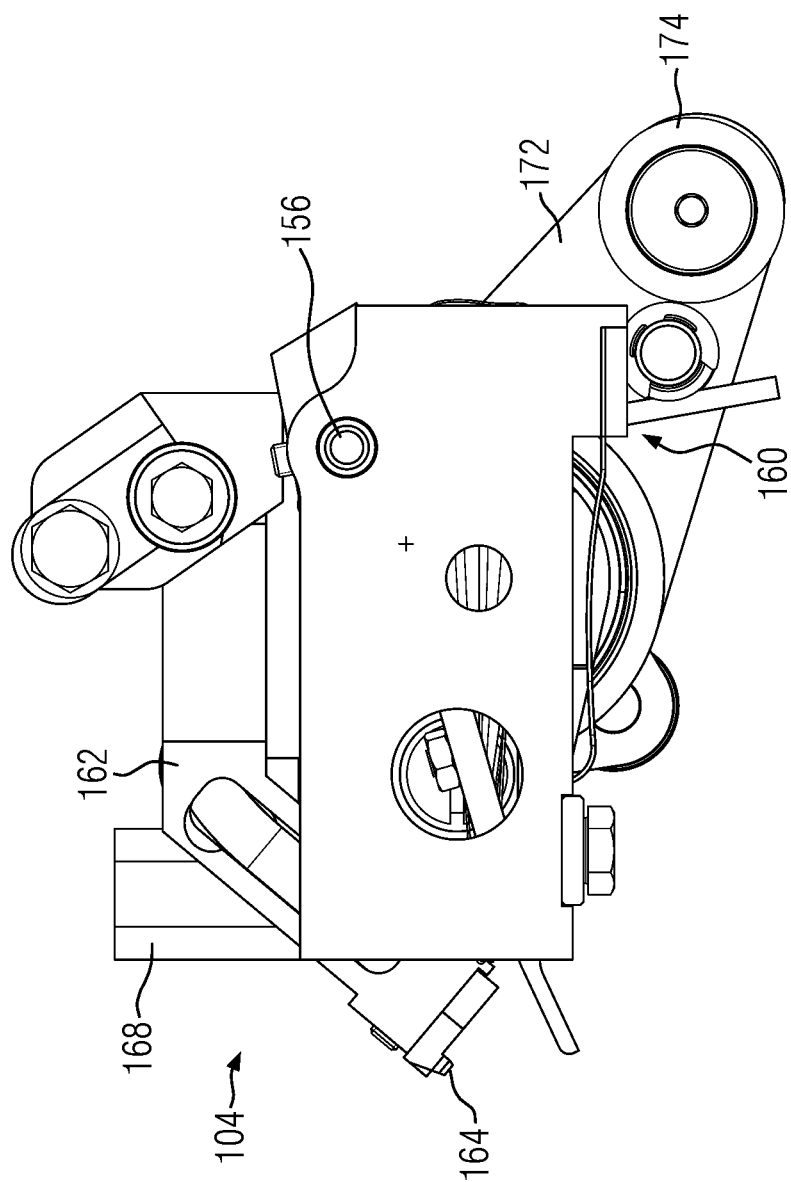
FIG. 7 shows a representation according to FIG. 5 in the closed position.

As can be seen in FIG. 3, the pouch 6 in the removal station is gripped by a pouch handling device 122 in the support 104 and pulled radially out of the support 104. For this purpose, the pouch handling device 122 has leading and trailing arms 124, which clamp the pouch in the area of the bottom 9 and pull it radially out of the support 104 (see FIG. 2). Said arms 124 are preceded by leading and trailing arms of a wrapping material handling device 126, not shown in FIG. 3, which grip the wrapping material passing tangentially over a wrapping material guide 130 past the transport wheel 100 to form the fold 14 and discharge it radially. In FIG. 3, in addition to the transport wheel 100, a sealing transport wheel 132 of a sealing station is shown, which receives the wrapping 4 together with the pouch 6, the thread 8 and the label 10, wherein the material of the wrapping 4 is already provided with the fold 14 and the transverse edge opposite the fold 14 and the two longitudinal edges are provided by a sealing device, which is essentially opposite the transport wheel 100 with respect to the rotation axis D of the sealing transport wheel 132, and correspondingly the pouch 6 is sealed aroma-tightly together with the label 10 and the thread 8.

FIGS. 2 and 3 show a cyclically pivoted inner opening cam 134 radially inwards, which pivots the pouch clamp 108 into the open position for insertion of the pouch 6 in the insertion station 102. At the removal station 118, an outer opening cam 136 is shown, which also does not rotate with the transport wheel 100 and which is attached to a pivotally operated lever and lifts the pouch clamp 108 from the pouch 6 for removal of the pouch in the removal station 118.

FIGS. 4 to 7 show details of the support 104.

Each support 104 has an axle beam 150, which is held freely rotatable on the transport wheel 100 by a ball bearing 152, which is placed in a bore 154 (cf. FIG. 3) of the transport wheel 100 and mounted there. At the free end of the axle beam 150 there is a support duct 106, in which the pouch clamp 108 is pivotally mounted. A pivot axis for the pivoting movement of pouch clamp 108 is identified by reference sign 156. The pouch clamp 108 is non-rotatably connected to an actuating sleeve 158, which is held pretensioned against the axle beam 150 by a clamping spring 160. A holder 162 is provided, which is non-rotatably connected to the actuating sleeve 158 and which carries at its free end an air knotting block 164 which partially protrudes beyond the opening of the support duct 106 and in any case in FIG. 6 partially obstructs the opening of the support duct 106. In the closed position according to FIG. 6, a hold-down spring 166 can be seen which interacts with the free end of the pouch clamp 108 to keep it pretensioned against the pouch 6. In the open position according to FIG. 4, this hold-down spring 166 is inside a receiving cylinder 168. In the open position according to FIG. 4, the pouch clamp 108 abuts against the upper wall in FIG. 4 of the support duct 106. Opposite to this, the opening of the support duct 106 is protruded by guide projections 170 which are inclined outwards in a funnel shape.

An actuating arm 172, which is firmly connected to the actuating sleeve 158, protrudes radially from the actuating sleeve 158 and is provided with a cam roller 174 at its free end. Said cam roller 74 interacts with the guide surfaces of the inner and outer opening cams 134, 136. As a result, the pouch clamp is pivoted into the open position against the force of the clamping spring 160 and the hold-down spring 166. If there is no interaction between the cam roller 174 and the cam contour of the opening cam 134 or 136, the pouch clamp 108 pivots into the closed position shown in FIG. 6. One end of the clamping spring 160 is supported on the actuating arm 172 (cf. FIGS. 5, 7).

At the end of the axle beam 150 opposite the support duct 106, two guide arms 176, 178 are provided, which extend radially with respect to the central longitudinal axis of the axle beam 150 and are protruded in the axial direction by guide pins 180, 182, which each carry cam rollers 184. Thereby, the guide pin 182 has a greater axial extension than the guide pin 180.

Each guide pin 180, 182 engages in a respective guide groove, which is recessed in a guide disc provided in a fixed position behind the transport wheel 100 according to the top view in FIGS. 2 and 3. The guide groove assigned to the guide pin 182 is deeper than the guide groove assigned to the guide pin 180. The grooves cross each other. They accommodate the cam rollers 184 of both guide pins 180, 182 with little play. Similar to the cam roller 174, the cam roller 184 also has a freely rotatable annular surface which is guided in the respective guide groove and can be brought into contact with the side walls of the groove with little friction.

Due to the rotatable mounting of the axle beam 150 via the ball bearing 152 opposite the rotating transport wheel 100 and the two guide pins 180, 182 provided eccentrically to the pivot axis of the support 104, which is formed by the central longitudinal axis of the axle beam 150, the pivoting movement of the support 104 within the scope of the rotating movement of the transport wheel 100 relative to the stationary guide disc can be generated and precisely specified.

The configuration with two guide pins 180, 182 allows a close and precise positive guidance of the pivoting movement of the support 104. As the top view according to FIGS. 2 and 3 shows, a total of six stations are provided in the circumferential direction of the transport wheel 100. Accordingly, the individual supports 104 are offset by 60° in circumferential direction. Thereby, on a transport path of 120°, the support 104 can be pivoted about 180° or on a transport path corresponding to 60° about exactly 90°.

In the embodiment, the rotating movement of the transport wheel 105 together with the cyclical movement of the inner opening cam 134 induces the opening and closing of the pouch clamp 108 in the area of the insertion station 102. In the removal station 118, the opening and closing of the pouch clamp 108 is effected by pivoting the outer opening cam 136 while the transport wheel 100 is stationary. Thereby—as shown in FIG. 3—the pouch clamp 108 is applied to the pouch 6. The holder 162 is held in a central position so that the endlessly fed material forming the label 10 can be cut off in the area of the label feeding station 112 without colliding with the holder 162. The inner opening cam 134 is pivoted relative to the transport wheel 100 when the transport wheel 100 is stationary. However, it is also pivoted against the rotation direction when the transport wheel 100 is rotating.

The label 10 fed in the label feeding station 112 is placed against the outer surface of the air knotting block 164 which, together with equipment parts of the connecting station 114, forms an air channel to guide the free end of the thread 8 in order to knot the thread 8 to the label 10 as described in EP 1 731 295 B1.

REFERENCE SIGNS LIST 2 packaging unit
4 wrapping
6 pouch
7 head
8 thread
9 bottom
10 label
12 slit
14 fold
16 leg
18 longitudinal welding seam
20 transverse welding seam
100 transport wheel
102 insertion station
104 support
106 support duct
108 pouch clamp
110 insertion segment
112 label feeding station 114 connecting station
116 thread securing station
118 removal station
120 pivoting station
122 pouch handling device
124 arms
126 wrapping material handling device
128 arms
130 wrapping material guide
132 sealing transport wheel
134 inner opening cam
136 outer opening cam
150 axle beam
152 ball bearing
154 bore
156 pivot axis
158 actuating sleeve
160 clamping spring
162 holder
164 air knotting block
166 hold-down spring
168 receiving cylinder
170 guide projection
172 actuating arm
174 cam roller
176 guide arm
178 guide arm
180 guide pin
182 guide pin
184 cam roller
D rotation axis
T transport direction

What is claimed is:

1. A device for transporting ready-cut and filled hose pieces within a machine for producing pouches filled with brewable material, comprising:

a transport wheel, comprising several pivotally mounted supports distributed around a circumference of the transport wheel and each for supporting a pouch;

an insertion station associated with the transport wheel, in which one of the hose pieces is inserted into the support in the radial direction of the transport wheel to form a pouch with at least one chamber between a head and a bottom of the pouch, with the bottom leading radially towards the center of the transport wheel; and a removal station associated with the transport wheel, wherein in the removal station the support is pivoted relative to the alignment in the insertion station such that the pouch is removed radially from the transport wheel with the bottom leading radially away from the center of the transport wheel.

2. The device according to claim 1, characterized in that between the insertion station and the removal station a label feeding station in which a label is fed to the head and a connecting station in which a thread is connected to the label and/or the pouch are provided and in which the pouch is held in the support with the head facing outwards.

3. The device according to claim 2, characterized in that a thread securing station is provided between the insertion station and the removal station which is mounted directly upstream of the removal station in the transport direction of the transport wheel and in which the thread connected to the label is forced into a slit provided on the label while the support is pivoted about 90°+/−10° relative to its position in the insertion station and the removal station.

4. The device according to according to claim 1, characterized in that the transport wheel has a bore to each support in which an axle beam carrying the support is pivotally mounted, which is connected to at least one guide arm extending transversely to a pivot axis of the axle beam the free end of which guide arm is guided in a guide circumferentially surrounding the rotation axis (D) of the transport wheel for imposing the pivoting movement of the support during the rotation of the transport wheel.

* * * * *